(12) United States Patent
Appleton

(10) Patent No.: US 9,422,914 B2
(45) Date of Patent: Aug. 23, 2016

(54) RADAR ABSORBING MATERIAL COMPATIBLE WITH LIGHTNING PROTECTION SYSTEMS

(75) Inventor: Steve Appleton, Fleet (GB)

(73) Assignee: Vestas Wind Systems A/S, Aarhus N. (DK)

( * ) Notice: Subject to any disclaimer, the term of this patent is extended or adjusted under 35 U.S.C. 154(b) by 424 days.

(21) Appl. No.: 14/002,656

(22) PCT Filed: Feb. 23, 2012

(86) PCT No.: PCT/DK2012/050063
§ 371 (c)(1),
(2), (4) Date: Jan. 13, 2014

(87) PCT Pub. No.: WO2012/116700
PCT Pub. Date: Sep. 7, 2012

(65) Prior Publication Data
US 2014/0118177 A1    May 1, 2014

(30) Foreign Application Priority Data

Mar. 1, 2011    (GB) .................... 1103493.1

(51) Int. Cl.
*H01Q 17/00* (2006.01)
*F03D 1/06* (2006.01)
*H01Q 1/48* (2006.01)
*H01Q 15/14* (2006.01)

(52) U.S. Cl.
CPC .............. *F03D 1/065* (2013.01); *F03D 1/0675* (2013.01); *F03D 80/30* (2016.05); *H01Q 1/48* (2013.01);
(Continued)

(58) Field of Classification Search
CPC ....... F03D 1/065; H01Q 15/14; H01Q 17/004

USPC ......................................... 342/1, 5
See application file for complete search history.

(56) References Cited

U.S. PATENT DOCUMENTS 3,938,152 A   2/1976  Grimes et al.
4,012,738 A   3/1977  Wright
(Continued)

FOREIGN PATENT DOCUMENTS

EP    1722618 A1   11/2006
WO    2004091049 A1   10/2004
(Continued)

OTHER PUBLICATIONS

International Searching Authority, International Search Report and Written Opinion issued in corresponding International Application No. PCT/DK2012/050063 dated Aug. 3, 2012, 11 pages.
(Continued)

*Primary Examiner* — Timothy A Brainard
(74) *Attorney, Agent, or Firm* — Wood, Herron & Evans, LLP

(57) ABSTRACT

A wind turbine component incorporating radar-absorbing material having increased compatibility with lightning protection systems is described. The radar absorbing material includes a ground plane having an electrical conductivity and/or a dielectric constant that is higher in the presence of an electric field having a frequency of 1 GHz and above than in the presence of an electric field having a frequency of 10 MHz and below. Suitable materials for the ground plane include ferroelectric and ferrimagnetic materials and percolating material combinations, all of which have frequency-dependent properties that can be tuned to make the ground plane highly reflective at radar frequencies and benign at lightning discharge frequencies.

28 Claims, 3 Drawing Sheets

(52) U.S. Cl.
CPC ............. *H01Q 15/14* (2013.01); *H01Q 15/145* (2013.01); *H01Q 17/00* (2013.01); *H01Q 17/004* (2013.01); *F05B 2260/99* (2013.01); *Y02E 10/721* (2013.01); *Y02E 10/722* (2013.01)

(56) References Cited

U.S. PATENT DOCUMENTS

| | | | |
|---|---|---|---|
| 2003/0146346 A1* | 8/2003 | Chapman, Jr. | B29C 66/721 244/123.3 |
| 2003/0179142 A1 | 9/2003 | Nakamura et al. | |
| 2011/0020110 A1 | 1/2011 | Presz, Jr. et al. | |

FOREIGN PATENT DOCUMENTS

| | | |
|---|---|---|
| WO | 2010109174 A1 | 9/2010 |
| WO | 2010122350 A1 | 10/2010 |

OTHER PUBLICATIONS

Intellectual Property Office, Search Report issued in corresponding GB Application Serial No. GB1103493.1 dated Jul. 1, 2011, 4 pages.

* cited by examiner

RADAR ABSORBING MATERIAL COMPATIBLE WITH LIGHTNING PROTECTION SYSTEMS

FIELD OF THE INVENTION

The present invention relates to radar absorbing materials (RAM), and in particular to RAM suitable for incorporating into wind turbine components and having improved compatibility with lightning protection systems.

BACKGROUND

It is known to incorporate radar-absorbing material (RAM) into composite structures such as wind turbine blades. This is done to reduce the radar reflectivity of the blades so that they do not interfere with radar systems such as air traffic control systems or marine radar systems. The frequency range of these radar signals is approximately 1-10 GHz, and hence the RAM incorporated in wind turbine blades is typically optimised to attenuate radar signals in this frequency range.

Many radar-absorbing materials are based upon the Salisbury Screen, which comprises three layers: a lossless dielectric layer sandwiched between a reflector layer or 'ground plane' and an impedance layer or 'lossy screen'. The lossless dielectric is of a precise thickness equal to a quarter of the wavelength of the radar wave to be absorbed; the ground plane comprises a layer of highly reflective conductive material such as metal or carbon; and the lossy screen is generally a thin resistive layer.

Circuit analogue (CA) RAM technology has proven to be particularly effective for use in wind turbine blades. This is similar to the Salisbury Screen arrangement, but the impedance layer is a CA layer comprising an array of elements, such as monopoles, dipoles, loops, patches or other geometries. The CA layer and the ground plane form a radar-absorbing circuit in the composite structure. The RAM employed in modern wind turbine blades typically uses a thin layer of carbon tissue, also referred to as 'carbon veil', as the ground plane.

Experimental tests have shown that the conductive ground plane employed in RAM has the potential to interfere with lightning protection systems, such as those incorporated in wind turbine blades to protect the blades from damage caused by lightning strike events. To illustrate this problem, a typical lightning protection system of a wind turbine blade will now be described with reference to FIGS. 1a-1d.

FIG. 1a is a plan view of a tip end 10 of a wind turbine blade 12. A lightning receptor 13 comprising a metal disc 14 is located on a suction surface 16 of the blade 12, near the tip 18 of the blade 12. Referring to FIG. 1b, which is a cross-sectional side view through the tip end 10 of the blade 12, it can be seen that the metal disc 14 is the head of a bolt 20. The bolt 20 is screwed into a conductive base 22, which is implanted within the tip end 10 of the blade 12. A similar bolt 24 is screwed into the opposite side of the base 22 to define a lightning receptor 26 on a pressure side 28 of the blade 12, at the tip end 10.

Referring still to FIG. 1b, the base 22 is connected to a lightning cable 30 via a connector element 32. The lightning cable 30 is earthed and extends longitudinally inside the blade 12, in a span wise direction, to the blade root. The cable 30 is surrounded by an insulating sheath and is attached to the main spar 32 of the blade 12 to prevent potentially damaging flashover discharges to the spar 32 from occurring.

In addition to the lightning receptors 13, 26 at the tip end 10, a series of secondary receptors 34 (FIG. 1c) are provided at intervals along the length of the blade 12. Referring now to FIG. 1c, which is a cross-section through an aerofoil part of the blade 12, between a leading edge 36 and a trailing edge 38, the secondary receptors 34 are also in the form of metal bolts 40 (FIG. 1d), which are screwed into respective receptor bases 42 (FIG. 1d) located adjacent an inner surface 44 of the blade shell 46. The secondary receptors 34 are connected to the lightning cable 30 (FIG. 1c) via connecting straps 48 extending between the base 42 of the respective receptor 34 and the lightning cable 30.

The lightning receptors 13, 26, 34 are designed to attract lightning strikes and channel electricity safely to ground via the lightning cable 30. Lightning clouds induce an electric field around the lightning receptors 13, 26, 34. The induced electric field is a low-frequency electric field, typically of the order of 10 MHz and below.

Referring to FIG. 1d, which is an enlarged view of the circled part 50 of FIG. 1c, a CA layer 52 is embedded within the composite structure of the blade shell 46, at a location between the inner surface 44 of the shell 46 and an outer surface 54 of the shell 46. A continuous carbon reflector layer 56, which serves as the ground plane, is adhered to the inner surface 44 of the shell 46. The lightning receptor 34 penetrates both the CA layer 52 and the carbon ground plane 56.

As shown in FIG. 1d, the base 42 of the lightning receptor 34 is close to, and in fact is in contact with, the conductive carbon ground plane 56. In this arrangement, the conductive carbon ground plane 56 tends to distort and reduce the induced electric field around the lightning receptors 13, 26, 34 in the presence of a charged lightning cloud. This can degrade the performance of the lightning receptors 13, 26, 34. Also, the conductive carbon ground plane 56 may be at a low potential, which presents a risk of potentially damaging flashover discharges occurring between the lightning cable 30 and the ground plane 56, or even in extreme cases, lightning striking the ground plane 56 in preference to the lightning receptors 13, 26, 34.

Against this background, it is an object of the present invention to provide RAM that is more compatible with lightning protection systems.

SUMMARY OF THE INVENTION

According to the present invention there is provided a wind turbine component incorporating radar absorbing material, wherein the radar absorbing material includes a ground plane having an electrical conductivity and/or a dielectric constant that is higher in the presence of an electric field having a frequency of 1 GHz and above than in the presence of an electric field having a frequency of 10 MHz and below.

The wind turbine component preferably includes a lightning protection system, or at least part of a lightning protection system, for example one or more lightning receptors.

The material is preferably highly conductive at frequencies of 1 GHz and above and acts as an electrical insulator at frequencies of 10 MHz and below. Highly conductive materials are good reflectors of electromagnetic waves. Selecting a material for the ground plane that is highly conductive in the presence of electric fields of 1 GHz and above ensures that the material will be a good reflector of most radar signals. Preferably the ground plane is optimised to reflect radar signals having a frequency in the range of 1-10 GHz, and more preferably in the range of 1-6 GHz, which includes most radar signals used for air traffic control and marine purposes. In addition, selecting a material that also exhibits low conductivity in the presence of electric fields having frequencies of 10 MHz and below ensures that the material is a poor conductor of electricity at lightning frequencies. This ensures that the ground plane does not interfere with the electric fields surrounding lightning receptors and hence does not detrimentally interfere with the performance of the lightning protection system.

Materials having a high dielectric constant are also good reflectors, but can interfere with the electric field surrounding lightning receptors and degrade the performance of the lightning protection system. Selecting a material for the ground plane having a relatively high dielectric constant at radar frequencies and a relatively low dielectric constant at lightning frequencies ensures optimal performance as a radar reflector whilst also ensuring compatibility with the lightning protection system.

The theory underpinning the invention will now be explained with reference to equations 1 to 3 below.

The reflection coefficient (R) of a radar signal at normal incidence upon an interface between materials 1 and 2 is given by equation 1 below, where $Z_1$ and $Z_2$ are the impedances of materials 1 and 2 respectively, calculated according to equation 2 below.

$$R = \frac{(Z_2 - Z_1)}{(Z_2 + Z_1)} \qquad 1$$

$$Z = \left(\frac{\mu}{\varepsilon}\right)^{\frac{1}{2}} \qquad 2$$

where $\mu$ is the magnetic constant and $\in$ is the dielectric constant of the material.

If material 2 is a good conductor, $Z_2$ approaches zero in equation 1, and the reflection coefficient (R) can be approximated by equation 3 below.

$$R = \frac{-Z_1}{Z_1} = -1 \qquad 3$$

A reflection coefficient (R) of $-1$ equates to 100% reflection, with a 180-degree phase change.

If material 2 has a high dielectric constant ($\in$), which is significantly higher than its magnetic constant ($\mu$), $Z_2$ will not be zero, but will be a small enough value to result in a suitably-high reflection coefficient (R).

Suitable materials for the ground plane include (i) ferroelectric materials; (ii) ferrimagnetic materials; and (iii) percolating material combinations. These materials may be tuned so that they are intrinsically only reflective at radar frequencies (typically 1-10 GHz for wind-turbine applications) but have benign properties at lightning discharge frequencies (10 MHz and below).

Preferably, a material is selected that has a suitably-high dielectric constant and/or a suitably-high conductivity in the presence of an electric field having a frequency of 1 GHz and above, i.e. radar frequencies. The material should be highly conductive at these frequencies, i.e. have a sheet resistance of approximately 0.02 Ω/sq (ohms per square) or less. The dielectric constant of the ground plane is preferably in the range of 80-120 in the presence of an electric field having a frequency of 1 GHz or above. More preferably, the dielectric constant is between 90-110, and preferably still, between 95-105 at frequencies of 1 GHz and above.

The ground plane material is selected to have a suitably-low conductivity and/or dielectric constant in the presence of electric fields of 10 MHz and below, i.e. lightning frequencies. The material preferably has a sheet resistance greater than approximately 100,000 Ω/sq at such frequencies. The dielectric constant is preferably as close as possible to the dielectric constant of other surrounding composites in the structure. Hence, the dielectric constant is preferably in the range of 1-10; more preferably, between 2-6, and preferably still between 3-5 at frequencies of 10 MHz and below.

Ferroelectric materials maintain a permanent electric polarization that can be reversed, or switched, in an external electric field. Examples of ferroelectric materials include barium titanate ($BaTiO_3$), lead titanate ($PbTiO_3$), sodium nitrite ($NaNO_2$) and lead zirconate titanate (PZT). It is known that the dielectric properties of some ferroelectric materials are frequency dependent. For example, the dielectric constant may increase with increasing frequency. The dielectric constant, or relative permittivity, may be relatively low at megahertz frequencies and relatively high at gigahertz frequencies. The reflectivity of the material increases as the dielectric constant increases. The material may be tuned to reflect radar frequencies (e.g. 1-10 GHz) more strongly than lightning frequencies (i.e. 10 MHz and below).

Many ferrimagnetic materials also have frequency-dependent dielectric constants and can be suitably selected to have a dielectric constant that increases with frequency in the same way as described above for ferroelectric materials. Examples of suitable ferrimagnetic materials include Iron(II,III) oxide, also known as magnetite ($Fe_3O_4$); hexaferrites such as barium hexaferrite ($BaFe_{12}O_{19}$), and other ferrites composed of iron oxides and elements such as aluminium, cobalt, nickel, manganese and zinc.

Advantageously, some ferroelectric and ferrimagnetic materials exhibit low electrical conductivity so that they do not interfere with lightning protection systems.

Suitable percolating material combinations for the ground plane include particles of conductive material dispersed in a non-metallic host. The higher the concentration of conductive material, the more reflective the material combination becomes. The host material may be a polymer matrix. The conductive material may include metal or carbon, for example carbon fibres, graphite or carbon nanotubes. The conductive material may be carbon black, which is relatively inexpensive. The properties of the percolating material combination may be tuned in accordance with percolation theory. For example, the material combination may have frequency-specific conductivity. The material combination is selected such that the conductivity is relatively low at megahertz frequencies to avoid interference with lightning receptors, and such that the conductivity is relatively high at gigahertz frequencies so that the ground plane is highly reflective to radar signals. The percolating combination may be tuned to exhibit resonant behaviour, such that the material is only conductive over a chosen frequency band.

Hence, a ground plane that exhibits low conductivity or has a low dielectric constant at such frequencies will have low electric field interactions with the lightning receptors at these frequencies, and will not reduce or otherwise interfere with the electric field around the lightning receptors. Therefore, the ground plane is more compatible with lightning protection systems.

In preferred embodiments of the invention, the wind turbine component is a rotor blade, and in particular it is a rotor blade incorporating one or more lightning receptors. It will of course be appreciated that the component may be any other part of a wind turbine liable to reflect radar signals. For example, the component may be a rotor hub, a nacelle or a tower. The inventive concept includes a wind turbine having said component and a wind farm including said wind turbine.

The invention also provides, within the same inventive concept, a radar-reflecting ground plane for incorporating into a composite structure, the ground plane having an electrical conductivity and/or a dielectric constant that is higher in the presence of an electric field having a frequency of 1 GHz and above than in the presence of an electric field having a frequency of 10 MHz and below.

BRIEF DESCRIPTION OF THE DRAWINGS

Reference has already been made to FIGS. 1a-1d of the accompanying drawings in which.

Figure 1A:
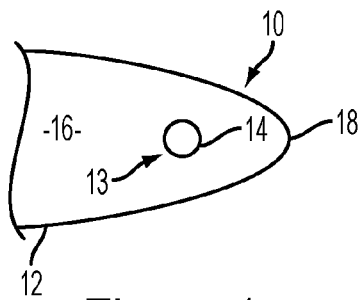
FIG. 1a is a plan view of a tip end of a wind turbine blade.
Figure 1B:
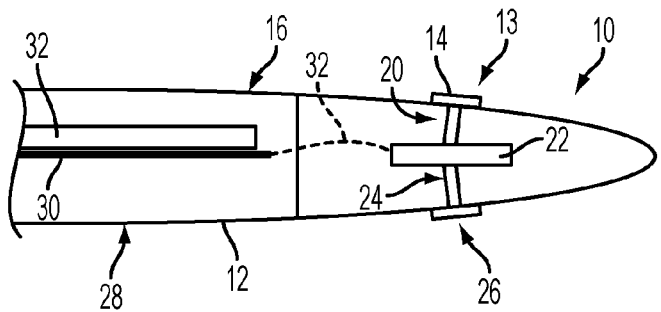
FIG. 1b is a cross-sectional side view through the tip end of the blade.
Figure 1C:
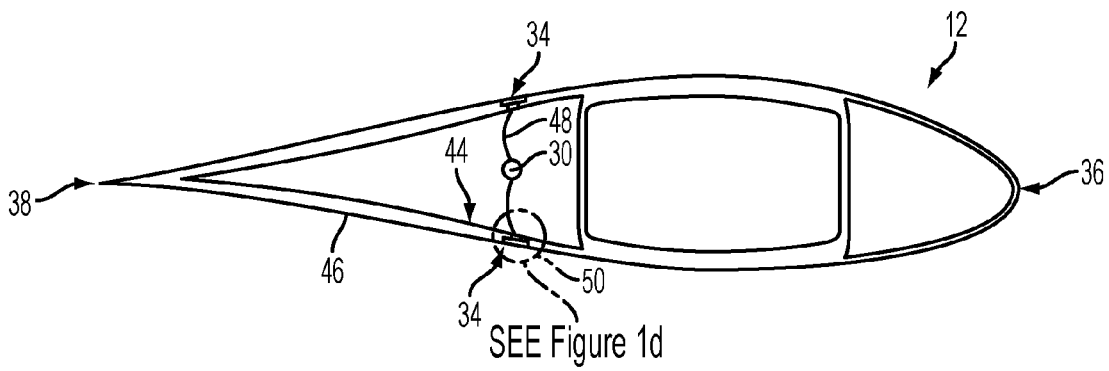
FIG. 1c is a cross-section through an aerofoil part of the blade, between a leading edge and a trailing edge.
Figure 1D:
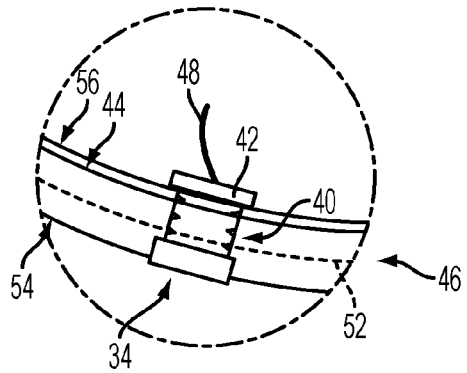
FIG. 1d is an enlarged view of part of FIG. 1c.
Figure 2A:
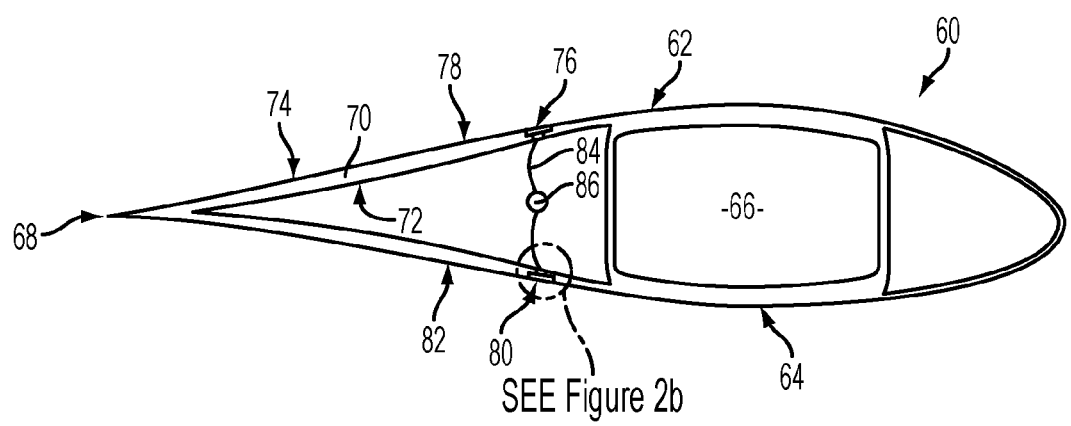
Figure 2B:
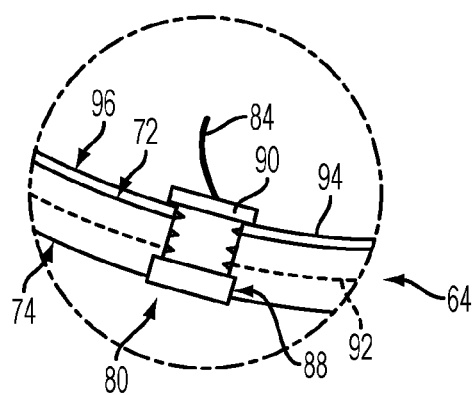
Figure 3A:
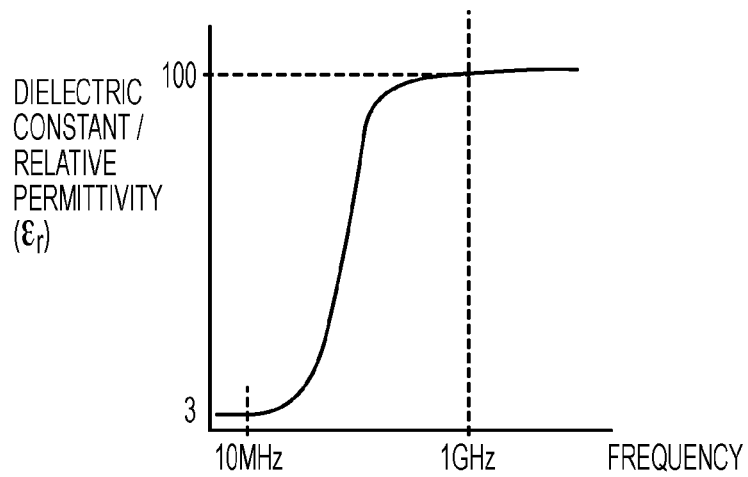
Figure 3B:
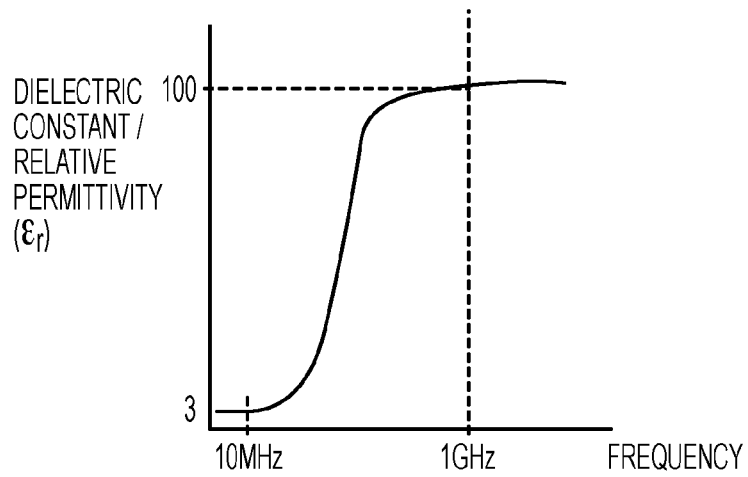
Figure 3C:
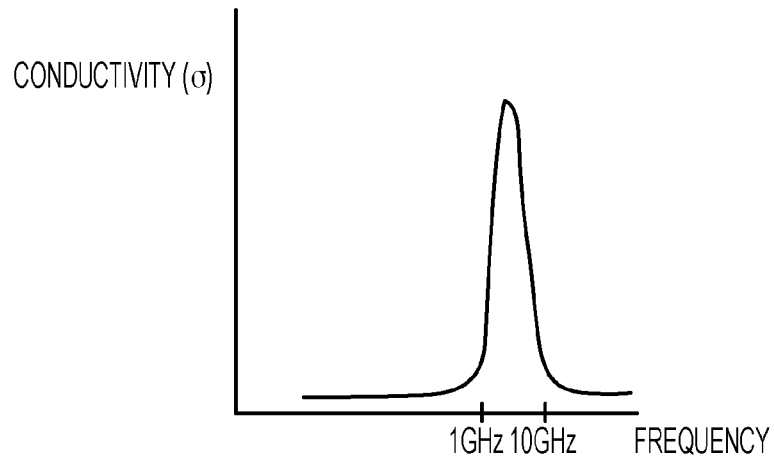

In order that the present invention may be more readily understood, embodiments of the invention will now be described, by way of example only, with reference to FIGS. 2 and 3, in which:

FIG. 2a is a cross-section through an aerofoil part of a wind turbine blade in accordance with the present invention;

FIG. 2b is an enlarged view of part of FIG. 2a, showing a RAM ground plane in accordance with the present invention;

FIG. 3a is a plot of the relative permittivity versus frequency, of a ground plane made of ferroelectric material tuned to become reflective at radar frequencies;

FIG. 3b is a plot of the relative permittivity versus frequency, of a ground plane made of ferrimagnetic material tuned to become reflective at radar frequencies; and FIG. 3c is a plot of the conductivity versus frequency, of a ground plane made of a percolating material combination tuned to become highly conductive at radar frequencies.

DETAILED DESCRIPTION

FIG. 2a shows a cross section of a wind turbine blade 60 in accordance with the present invention. The blade 60 is constructed from two aerodynamic shells, an upper shell 62 and a lower shell 64, which are formed from a glass fibre cloth and resin composite. The shells 62, 64 are supported by a tubular structural spar 66 formed from glass fibre and carbon fibre.

The spar 66 forms the primary strengthening structure of the blade 60. At the rear of each shell 62, 64 and towards the trailing edge 68 of the blade 60, the shells 62, 64 are formed with a sandwich-panel construction, in which a foam core 70 is bonded between an inner sheet 72 and an outer sheet 74 of glass fibre. These sheets 72, 74 are also known as 'skins'. The foam core 70 is used to separate the glass fibre skins 72, 74 and to keep the shell 62, 64 stiff in this region.

The wind turbine blade 60 incorporates a lightning protection system in the form of a first series of lightning receptors 76 on a suction surface 78 of the blade 60, and a second series of lightning receptors 80 on a pressure surface 82 of the blade 60. The lightning receptors 76, 80 in each series are located at five-meter intervals along the length of the blade 60. Two lightning receptors 76, 80 are visible in the cross-sectional view of FIG. 2a. The lightning receptors 76, 80 are attached, via conducting straps 84, to a cable 86, which runs longitudinally inside the blade 60 and is earthed.

FIG. 2b is a close-up view of one of the lightning receptors 80 shown in FIG. 2a, on the pressure surface 82 of the blade 60. The lightning receptor 80 is located within an aperture 88 in the outer skin 74, and screws into a base 90 located inside the blade 60. The composite structure of the wind turbine blade shell 64 includes radar absorbing material (RAM) in the form of a circuit analogue (CA) layer 92 and a ground plane 94 in spaced-apart relation. As shown in FIG. 2b, the base 90 of the lightning receptor 80 abuts an inner surface 96 of the ground plane 94.

Referring still to FIG. 2b, The CA layer 92 comprises a circuit printed in the form of a pattern using carbon ink on a layer of E-glass. The CA layer 92 is embedded within the shell structure 64, and is provided inwardly of the outer skin 74. In this example, the ground plane 94 is provided inwardly of the inner skin 72, and comprises a layer of barium titanate ($BaTiO_3$), which is a ferroelectric material. The $BaTiO_3$ layer 94 is painted onto an inner surface of the inner skin 72. Various other techniques of applying the $BaTiO_3$ layer are outlined at the end of this description.

Referring to FIG. 3a, this is a plot of the relative permittivity (dielectric constant) of the ferroelectric ground plane 94 versus frequency. The dielectric constant of the ground plane 94 is frequency dependent. At frequencies of approximately 10 MHz and below, which correspond to the frequencies of the induced electric fields surrounding the lightning receptors in the presence of a charged lightning cloud, the dielectric constant of the ground plane 94 is relatively low, circa 3. When the dielectric constant is low, the ferroelectric material comprising the ground plane 94 does not affect the electric fields surrounding the lightning receptors 76, 80, hence the material is compatible with lightning protection systems. Conversely, at frequencies above approximately 1 GHz, which are typical of radar signals, the dielectric constant is relatively high, of the order of 100. The higher the dielectric constant, the more reflective the ground plane 94 becomes, by virtue of equations 1 and 2 above. Hence, the ground plane 94 in this example is optimised to reflect most radar frequencies.

In another embodiment of the invention, the ground plane 94 comprises a film of Iron(II,III) oxide, also known as magnetite ($Fe_3O_4$), which is a crystalline ferrimagnetic material. Referring to FIG. 3b, this is a plot of the dielectric constant of the ferrimagnetic ground plane 94 versus frequency. As with the previous example, the dielectric constant of the ground plane 94 is frequency dependent. At frequencies of approximately 10 MHz and below, which correspond to the frequency of the electric field surrounding the lightning receptors 76, 80 in the presence of a charged lightning cloud, the dielectric constant is relatively low, circa 3. Conversely, at frequencies of approximately 1 GHz and above, which are typical of most radar signals of interest for wind turbine applications, the dielectric constant is relatively high, of the order of 100. For reasons already described above, the ground plane 94 is optimised to reflect most radar signals, whilst also being compatible with lightning protection systems.

In a further embodiment of the invention, the ground plane 94 comprises a percolating material combination, in which particles of carbon black are dispersed within an epoxy resin matrix host. Referring to FIG. 3c, this is a plot of the conductivity of the ground plane 94 versus frequency. The conductivity of the ground plane 94 is frequency dependent. At frequencies of approximately 10 MHz and below, which correspond to the frequencies of the electric fields surrounding the lightning receptors in the presence of a charged lightning cloud, the conductivity is relatively low.

The properties of the percolating combination are tuned so that the conductivity exhibits a resonance peak at a particular frequency or over a particular frequency band. In this example, the maximum conductivity occurs over a frequency band of 1 to 10 GHz. The higher the conductivity, the more reflective the ground plane becomes, by virtue of equations 1 and 2 above. Hence, the ground plane 94 is optimised to reflect radar frequencies of 1 to 10 GHz. As conductivity is low at frequencies of 10 MHz and below, the ground plane 94 does not interfere with the electric fields surrounding the lightning receptors 76, 80, and hence is compatible with the lightning protection system.

It will be appreciated that many modifications may be made to the specific examples described above without departing from the scope of the invention as defined by the accompanying claims. In particular the ground plane 94 may be made from any material that is suitably reflective at radar frequencies and has suitably-low conductivity at much lower frequencies to ensure compatibility with lightning protection systems in accordance with the theoretical considerations presented herein.

Also, the location of the ground plane 94 within the composite structure 64 may differ from that shown in the accompanying drawings. The main consideration here is to ensure suitable separation between the ground plane 94 and the CA layer 92 so that the RAM is optimised to attenuate radar signals of a desired frequency. Whilst in the examples described above, the ground plane 94 is applied to the inner surface of the inner skin 72, the ground plane 94 may instead be provided outwardly of the inner skin 72, for example to the outer surface of the inner skin 72.

The frequency-tuned materials comprising the ground plane 94 may conveniently be employed as particles dispersed in a carrier matrix, for example to form a paint or film layer. Hence, the ground plane 94 may be painted onto the inner or outer surface of the inner skin 72 or applied to the relevant surface in the form of a suitably-loaded polymer film. Alternatively, the ground plane 94 may be integrally formed with a composite skin, such as the inner skin 72. For example, the inner skin 72 may be moulded from a resin loaded with a suitable ferroelectric or ferrimagnetic material or loaded with conductive particles to form a percolating material combination. In yet further embodiments, the frequency-tuned materials may be incorporated into a fabric or otherwise applied to a fabric, which may be laid up as part of the composite skin. It will of course be appreciated that, in other embodiments, the CA layer 92 may be replaced with an alternative impedance layer.

The invention claimed is:

1. A wind turbine component incorporating radar absorbing material, wherein the radar absorbing material includes a ground plane having an electrical conductivity and/or a dielectric constant that is higher in the presence of an electric field having a frequency of 1 GHz and above than in the presence of an electric field having a frequency of 10 MHz and below.

2. The wind turbine component of claim 1, wherein the ground plane comprises a ferroelectric material.

3. The wind turbine component of claim 2, wherein the ferroelectric material is selected from barium titanate (BaTiO$_3$), lead titanate (PbTiO$_3$), sodium nitrite (NaNO$_2$) and lead zirconate titanate (PZT).

4. The wind turbine component of claim 1, wherein the ground plane comprises a ferrimagnetic material.

5. The wind turbine component of claim 4, wherein the ferrimagnetic material is selected from magnetite; a hexaferrite or other ferrites composed of iron oxides and other elements.

6. The wind turbine component of claim 1, wherein the ground plane comprises a percolating material combination.

7. The wind turbine component of claim 6, wherein the percolating material combination comprises particles of conductive material dispersed in a non-metallic host.

8. The wind turbine component of claim 7, wherein the non-metallic host comprises a polymer matrix.

9. The wind turbine component of claim 7, wherein the conductive particles are particles of metal or carbon.

10. The wind turbine component of claim 1, wherein the ground plane is optimised to reflect radar signals having a frequency in the range of 1-10 GHz.

11. The wind turbine component of claim 1, wherein the ground plane has a sheet resistance of less than 0.02 Ω/sq in the presence of an electric field having a frequency of 1 GHz and above.

12. The wind turbine component of claim 1, wherein the ground plane has a dielectric constant of 80-120 in the presence of an electric field having a frequency of 1 GHz and above.

13. The wind turbine component of claim 1, wherein the ground plane has a dielectric constant of 90-110 in the presence of an electric field having a frequency of 1 GHz and above.

14. The wind turbine component of claim 1, wherein the ground plane has a dielectric constant of 95-105 in the presence of an electric field having a frequency of 1 GHz and above.

15. The wind turbine component of claim 1, wherein the ground plane has a sheet resistance that is greater than 100,000 Ω/sq in the presence of an electric field having a frequency of 10 MHz and below.

16. The wind turbine component of claim 1, wherein the ground plane has a dielectric constant of 1-10 in the presence of an electric field having a frequency of 10 MHz and below.

17. The wind turbine component of claim 1, wherein the ground plane has a dielectric constant of 2-6 in the presence of an electric field having a frequency of 10 MHz and below.

18. The wind turbine component of claim 1, wherein the ground plane has a dielectric constant of 3-5 in the presence of an electric field having a frequency of 10 MHz and below.

19. The wind turbine component of claim 1, wherein the component includes at least part of a lightning protection system.

20. The wind turbine component of claim 1, wherein the component includes one or more lightning receptors.

21. The wind turbine component of claim 20, wherein the ground plane abuts the one or more lightning receptors.

22. The wind turbine component of claim 1, wherein the radar absorbing material further comprises an impedance layer spaced apart from the ground plane.

23. The wind turbine component of claim 22, wherein the impedance layer is a circuit analogue layer.

24. The wind turbine component of claim 22, wherein the radar absorbing material further comprises at least one dielectric layer between the impedance layer and the ground plane.

25. The wind turbine component of claim 1, wherein the wind turbine component is a rotor blade.

26. A wind turbine comprising the component of claim 1.

27. A wind farm including the wind turbine of claim 26.

28. A radar-reflecting ground plane for incorporating into a composite structure, the ground plane having an electrical conductivity and/or a dielectric constant that is higher in the presence of an electric field having a frequency of 1 GHz and above than in the presence of an electric field having a frequency of 10 MHz and below.

* * * * *